United States Patent
Yu

(10) Patent No.: US 7,424,828 B2
(45) Date of Patent: Sep. 16, 2008

(54) DEVICE FOR DETECTING A CRACKED SUBSTRATE

(75) Inventor: Wen-Cheng Yu, Tao Yuan Shien (TW)

(73) Assignee: AU Optronics Corporation, Hsin-Chu (TW)

( * ) Notice: Subject to any disclaimer, the term of this patent is extended or adjusted under 35 U.S.C. 154(b) by 140 days.

(21) Appl. No.: 11/476,154

(22) Filed: Jun. 28, 2006

(65) Prior Publication Data

US 2007/0022820 A1    Feb. 1, 2007

(30) Foreign Application Priority Data

Jul. 29, 2005 (TW) ............................... 94125896 A

(51) Int. Cl.
*G01L 1/24* (2006.01)
(52) U.S. Cl. ............................. 73/800; 73/804; 73/808; 356/237.3; 356/237.4; 356/237.5
(58) Field of Classification Search .................. 73/800, 73/804, 808; 356/237.2, 237.3, 237.4, 237.5
See application file for complete search history.

(56) References Cited

U.S. PATENT DOCUMENTS 4,695,482 A * 9/1987 Weiswurm ................. 427/96.6
4,716,459 A * 12/1987 Makabe et al. .............. 348/133
5,534,067 A * 7/1996 Fulker et al. ................ 118/681
6,265,017 B1 * 7/2001 Hogan et al. .................. 427/8
7,057,706 B2 * 6/2006 Ozaki et al. .................. 355/53
7,205,166 B2 * 4/2007 Gotkis et al. ................. 438/14
7,212,780 B2 * 5/2007 Weinlich et al. ............ 399/394
7,283,224 B1 * 10/2007 Smithgall ................. 356/237.1
2002/0060235 A1 * 5/2002 Nagafuku et al. ............. 228/10
2002/0073537 A1 * 6/2002 Sumi ........................... 29/832
2004/0047661 A1 * 3/2004 Weinlich et al. ............ 399/381
2006/0087647 A1 * 4/2006 Bagley et al. ............. 356/237.2

* cited by examiner

*Primary Examiner*—Edward Lefkowitz
*Assistant Examiner*—Freddie Kirkland, III
(74) *Attorney, Agent, or Firm*—Bacon & Thomas, PLLC

(57) ABSTRACT

A substrate detection system is disclosed to include a conveyer that delivers the substrates, a sensor that detects the length of each substrate being delivered by the conveyer over the top side of the sensor, and a processor that compares the detection length value of each substrate detected by the sensor with a predetermined length value stored therein so as to immediately stops the conveyer when the detection length value of one substrate is unequal to the predetermined length value. In an alternate form, the time value in which each substrate passed over the sensor is used as a parameter for judgment.

12 Claims, 5 Drawing Sheets

DEVICE FOR DETECTING A CRACKED SUBSTRATE

BACKGROUND OF THE INVENTION

1. Field of the Invention

The present invention relates to apparatus for detecting a cracked substrate, and more particularly to a substrate detection system, which detects the intact status of each substrate during its delivery by a conveyer.

2. Description of Related Art

During the fabrication of a substrate, for example, TFT-LCD (Thin Film Transistor Liquid Crystal Display), the surface cleaning of the substrate is quite important so that the desired high quality and high stability standards can be obtained.

During fabrication, a substrate may crack due to a variety of factors. When the delivery apparatus, for example, conveyer keeps, delivering this cracked substrate, the substrates delivered subsequently may also crack, and further result serious loss.

Please refer to FIG. 1A. FIG. 1A is a schematic drawing showing the detection of a cracked substrate according to the prior art. FIG. 1B is a schematic top plain view of a part of FIG. 1A. According to this conventional design, a conveyer 92 with a sensor 93 completes the detection of the cracked substrate. As the conveyer delivers the substrate 91 and the position of the substrate 91 is set, the sensor 93 will locate below the substrate 91. At the same time, the sensor 93 starts to detect the existence of the substrate 91, and further detect the cracked status of the substrate 91.

According to the aforesaid detection method, the sensor 93 detects only one specific part of the substrate 91. If the location of the cracked area of a cracked substrate 91 that has been positioned in the detection position does not pass through the top side of the sensor 93, the sensor 93 cannot detect the cracked status, and cracked substrate 91 will pass the detection, thus a detection error occurs.

SUMMARY OF THE INVENTION

The present invention provides a substrate detection system, which improves the aforesaid problem. The substrate detection system of the present invention includes a conveyer and a detection device. The conveyer is adapted to deliver at least one substrate. The delivered substrate each has a bottom surface supported on the conveyer, and a length.

The detection device is adapted to detect any cracking status of the substrate being delivered by the conveyer, and comprises a sensor and a processor. The sensor is set corresponding to the bottom surface of each substrate and adapted to detect the length of each substrate during delivery of the substrate by the conveyer so as to obtain a detection length value for the respective substrate and to output a signal containing the detection length value.

The processor is coupled to the sensor, and adapted to receive the signal outputted from sensor. The processor further compares the detection length value contained in the signal with a predetermined length value stored therein. The processor will send a signal to stop the conveyer when the detection length value contained in the signal is unequal to the predetermined length value.

Therefore, during the delivery of the at least one substrate by the conveyer, the sensor detects the length of each substrate and determines if the detection length value is equal to the predetermined length value or not. If the detection length value is unequal to the predetermined length value, it means that the currently detected substrate is a cracked substrate, and the processor immediately stops the conveyer. The effective detection range of the sensor covers the length part of the substrate passing through the top side of the sensor, i.e., the sensor can achieve the detection of each substrate without stopping the conveyer during delivery of each substrate by the conveyer. Therefore, the detection of the present invention is not limited to a specific point at each substrate. This detection method expands the induction area of each substrate, thereby improving the detection accuracy and reducing the possible loss due to a detection error.

The sensor can be a photoreflective sensor, inductive sensor, or any equivalent sensors.

Further, a power amplifier may be coupled between the sensor and the processor to amplifies the signal outputted from the sensor.

The conveyer can be a roller conveyer used in a manufacturing equipment, for example, a photolithographic or etching equipment.

The sensor of the present invention is not limited to the aforesaid type that detects the length of each substrate being delivered by the conveyer. Alternatively, the sensor can be constructed to detect the time in which each substrate passed through the top side of the sensor. When the detection time value obtained from the sensor is unequal to the predetermined time value stored in the processor, the processor immediately stops the conveyer, i.e., the aforesaid first embodiment uses length as a parameter, and this second embodiment uses time as a parameter.

DETAILED DESCRIPTION OF THE PREFERRED EMBODIMENT

Figure 1A:
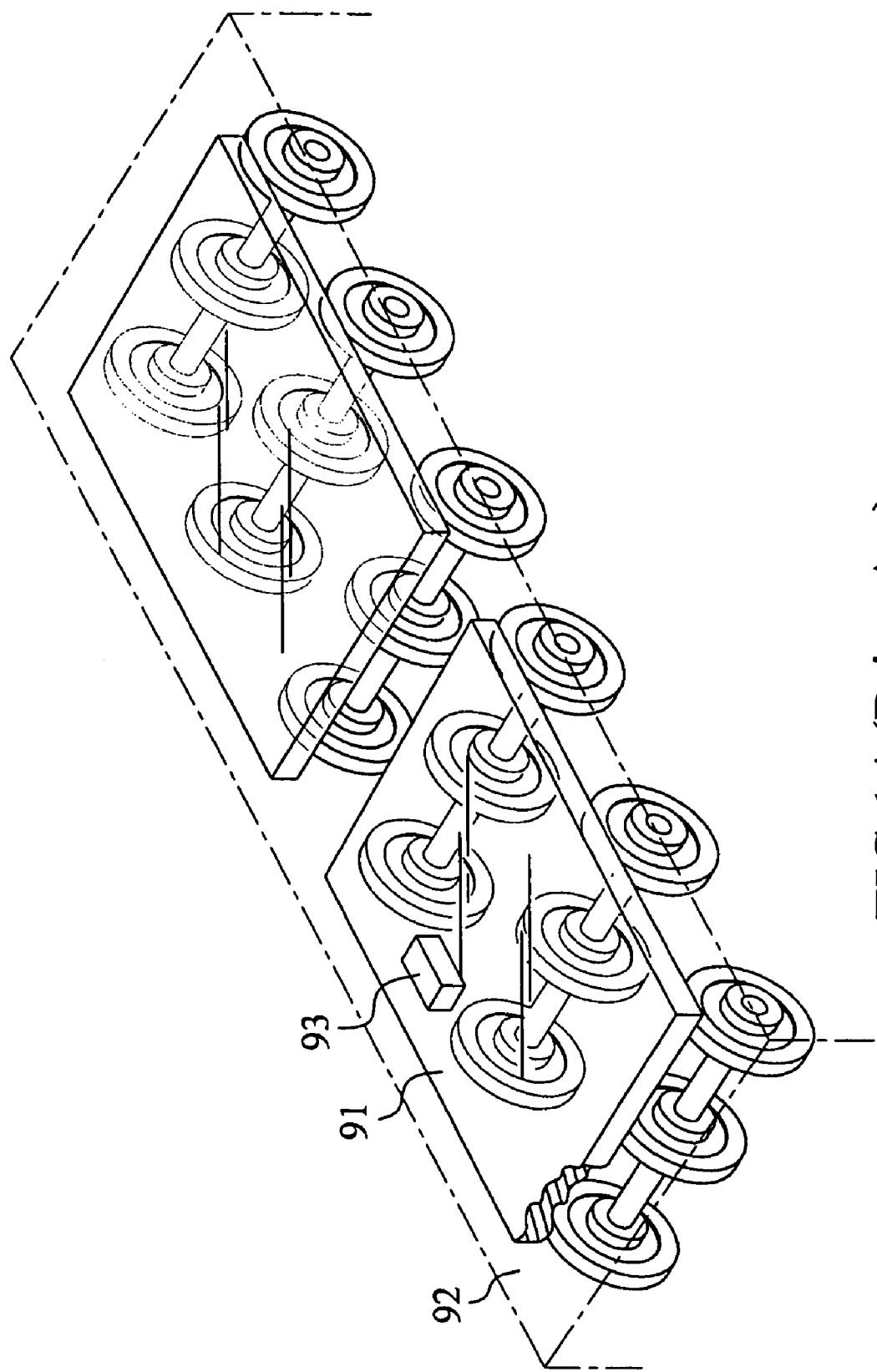
FIG. 1A is a schematic drawing showing the detection of a cracked substrate according to the prior art.
Figure 1B:
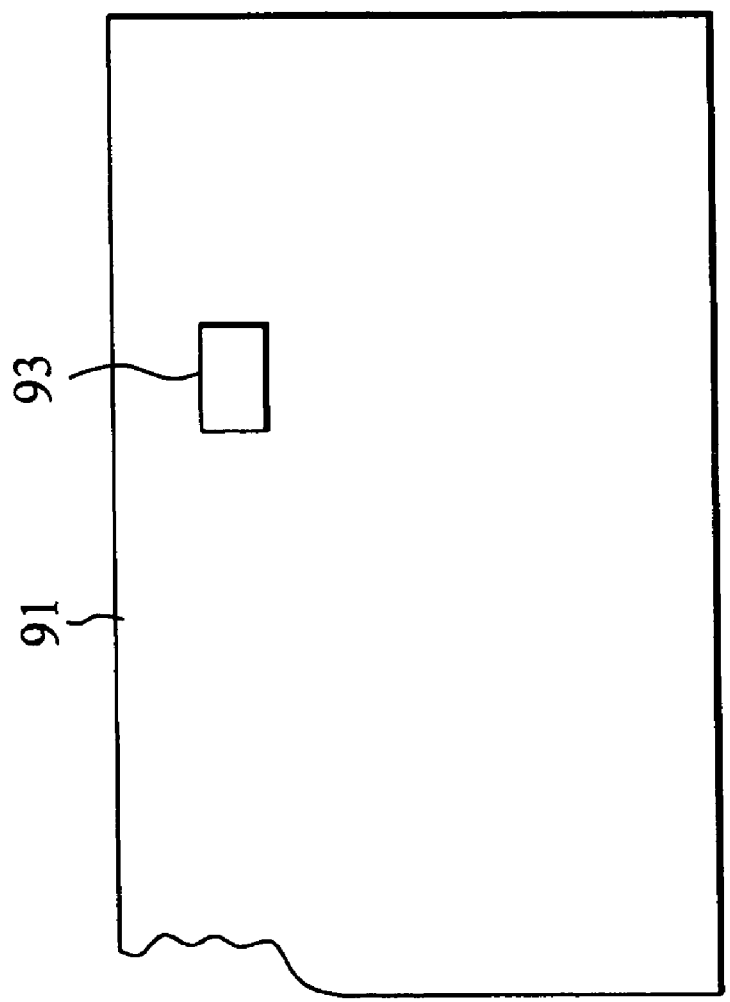
FIG. 1B is a schematic top plain view of a part of FIG. 1A.
Figure 2A:
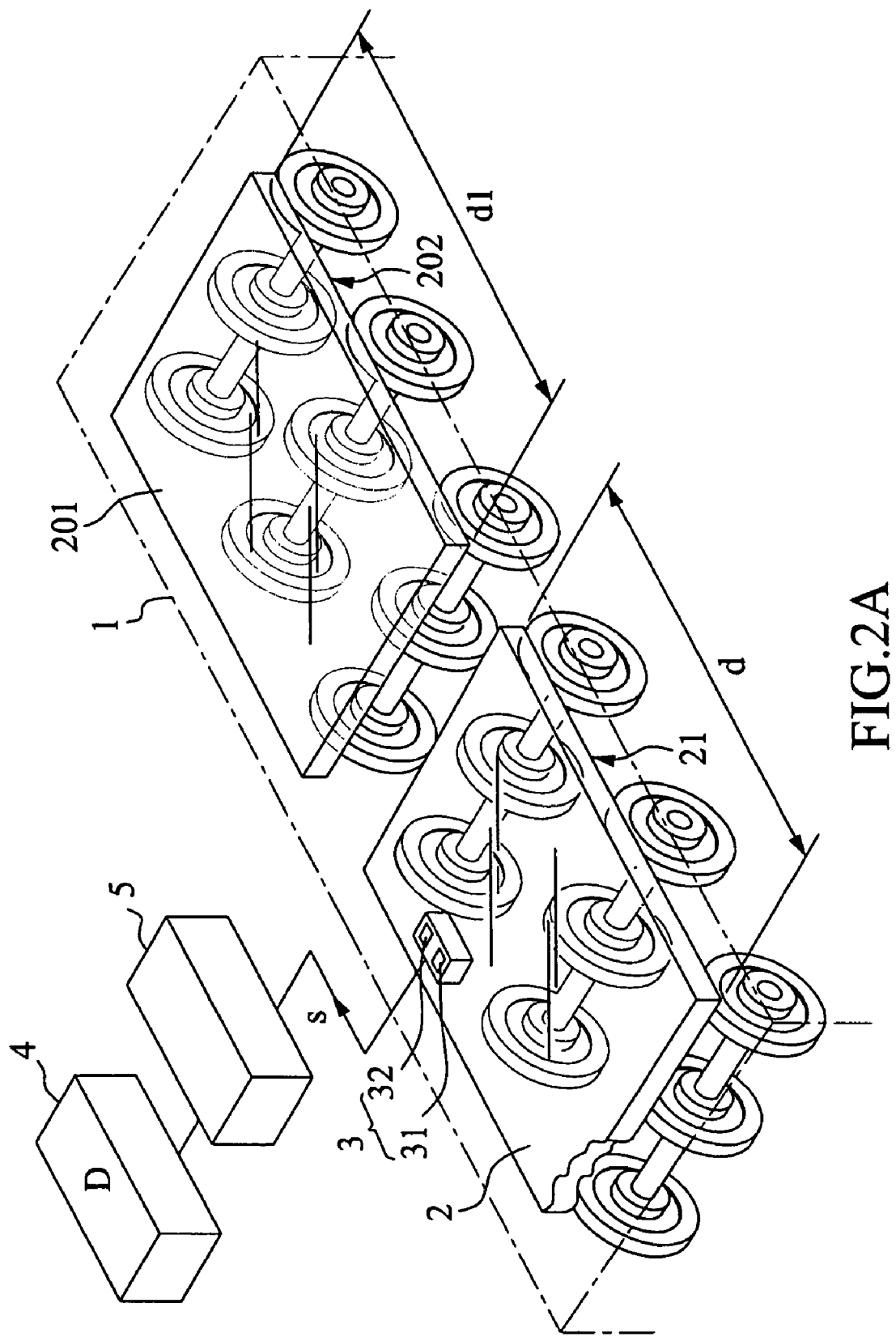
FIG. 2A is a schematic perspective view of a first embodiment of the present invention.
Figure 2B:
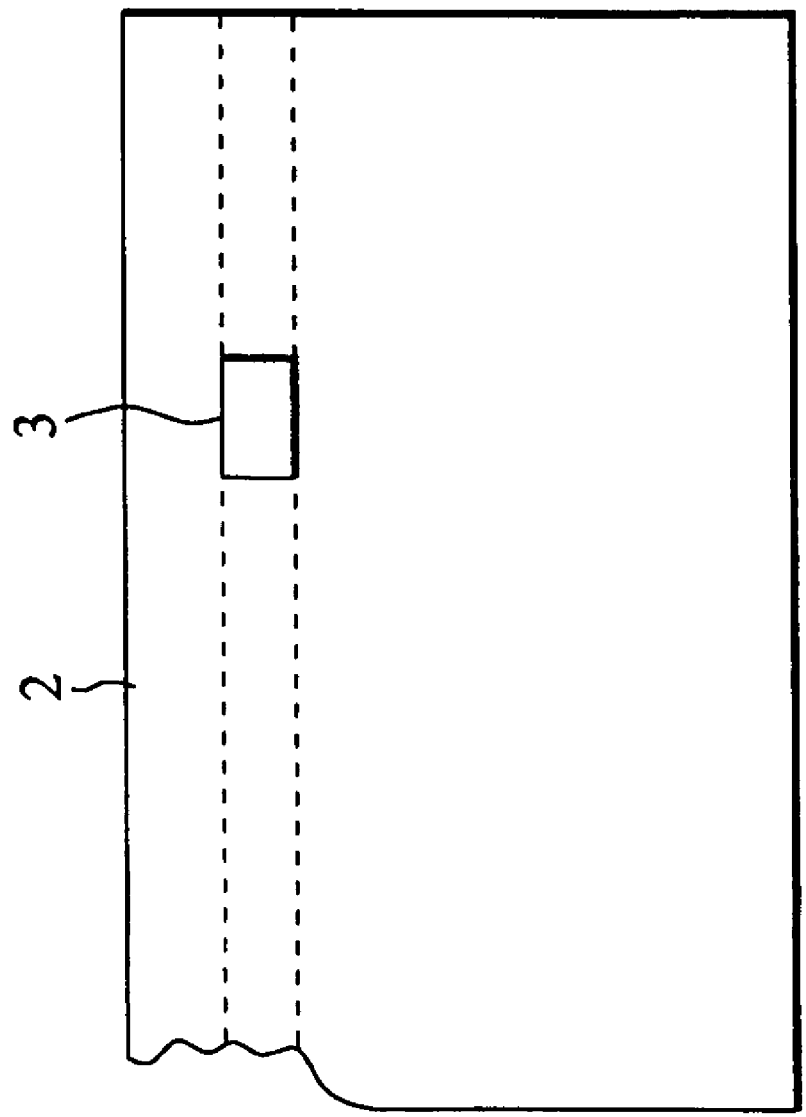
FIG. 2B is a schematic top plain view of a part of FIG. 2A.

Referring to FIGS. 2A and 2B, a conveyer 1 is shown installed in a manufacturing system, for example, a photolithographic system. The conveyer 1 according to this embodiment is a roller delivery apparatus. The detecting device of the present invention is adapted to detect any substrates being carried on the conveyer 1. Further, two substrates 2, 201 are carried on the conveyer 1. According to this embodiment, one substrate 201 is a complete substrate and the other substrate 2 is a cracked substrate.

Each of the substrates 2, 201 has a bottom surface 21, 202 supported on the conveyer 1 for allowing the substrates 2, 201 to be delivered by the conveyer 1. Further, the substrates 2, 201 each have a length d, d1.

The detecting device of the present invention comprises a sensor 3, a processor 4, and a power amplifier 5 coupled between the sensor 3 and the processor 4.

The aforesaid sensor 3 is a photoreflective sensor, having an emitting side 31 and a receiving side 32. The sensor 3 corresponds to the bottom surface and detects the length of the delivered substrate to obtain a detection length value. The value is detected by making the emitting side 31 continuously emit a light source. On the other hand, the receiving side 32 receives the light from the light source. After detecting, the sensor 3 sends a signal s that contains the aforesaid detection length value. The power amplifier 5 is coupled to the receiving side 32 of the sensor 3, and adapted to amplifier the signal s outputted from the sensor 3.

The processor 4 is coupled to the power amplifier 5 to receive the signal s outputted from the sensor 3, having stored therein a predetermined length value d.

When the complete substrate 201 is passing through the sensor 3 during delivery by the conveyer 1, the sensor 3 detects the length d1 of the substrate 201, thereby obtaining a detection length value. When the processor 4 received a signal s from the sensor 3 through the power amplifier 5, it immediately compares the detection length value contained in the received signal s with the predetermined length value d. Because the length d1 (detection length value) of the substrate 201 is equal to the predetermined length value D stored in the processor 4, the conveyer 1 keeps operating.

On the contrary, when the cracked substrate 2 is passing through the sensor 3, the sensor 3 detects the length d of this substrate 2, thereby obtaining a detection length value and sending a signal s containing this detection length value to the power amplifier 5 and then the processor 4. When the processor 4 received the signal s from the sensor 3 through the power amplifier 5, it immediately compares the detection length value contained in the received signal s with the predetermined length value d. Because this substrate 2 is a cracked substrate, the length d (detection length value) of this substrate 2 is unequal to the predetermined length value D stored in the processor 4, the processor 4 immediately stops the conveyer 1, preventing a possible loss due to continuous delivery of substrates.

Therefore, during the delivery of the substrates 2, 201 by the conveyer 1, the detection device of the present invention detects the length d, d1 of the substrates 2, 201 (detection length value) and determines if the detection length value is equal to the predetermined length value D or not. If the detection length value is unequal to the predetermined length value D, it means that the currently detected substrate is a cracked substrate, and therefore the processor 4 immediately stops the conveyer 1. As indicated by the imaginary lines in FIG. 2B, the effective detection range of the sensor 3 covers the length part of the substrate 2 passing over the top side of the sensor 3, i.e., the detection of the substrates 2, 201 can be achieved during delivery of the substrates 2, 201 by the conveyer 1 without stopping the conveyer 1. Therefore, the detection of the present invention is not limited to a specific point at the substrate 2, 201. This detection method expands the induction area of the substrate 2, 201, thereby improving the detection accuracy and reducing the possible loss due to a detection error.

In the aforesaid embodiment, the length d, d1 of the substrate 2, 201 is used as a parameter for comparison. Alternatively, the time within which the length d, d1 of the substrate 2, 201 passed over the sensor 3 can be used as a substrate for comparison, i.e., the conveyer 1 is stopped when the time value detected by the sensor 3 is unequal to the predetermined time value stored in the processor 4.

Figure 3:
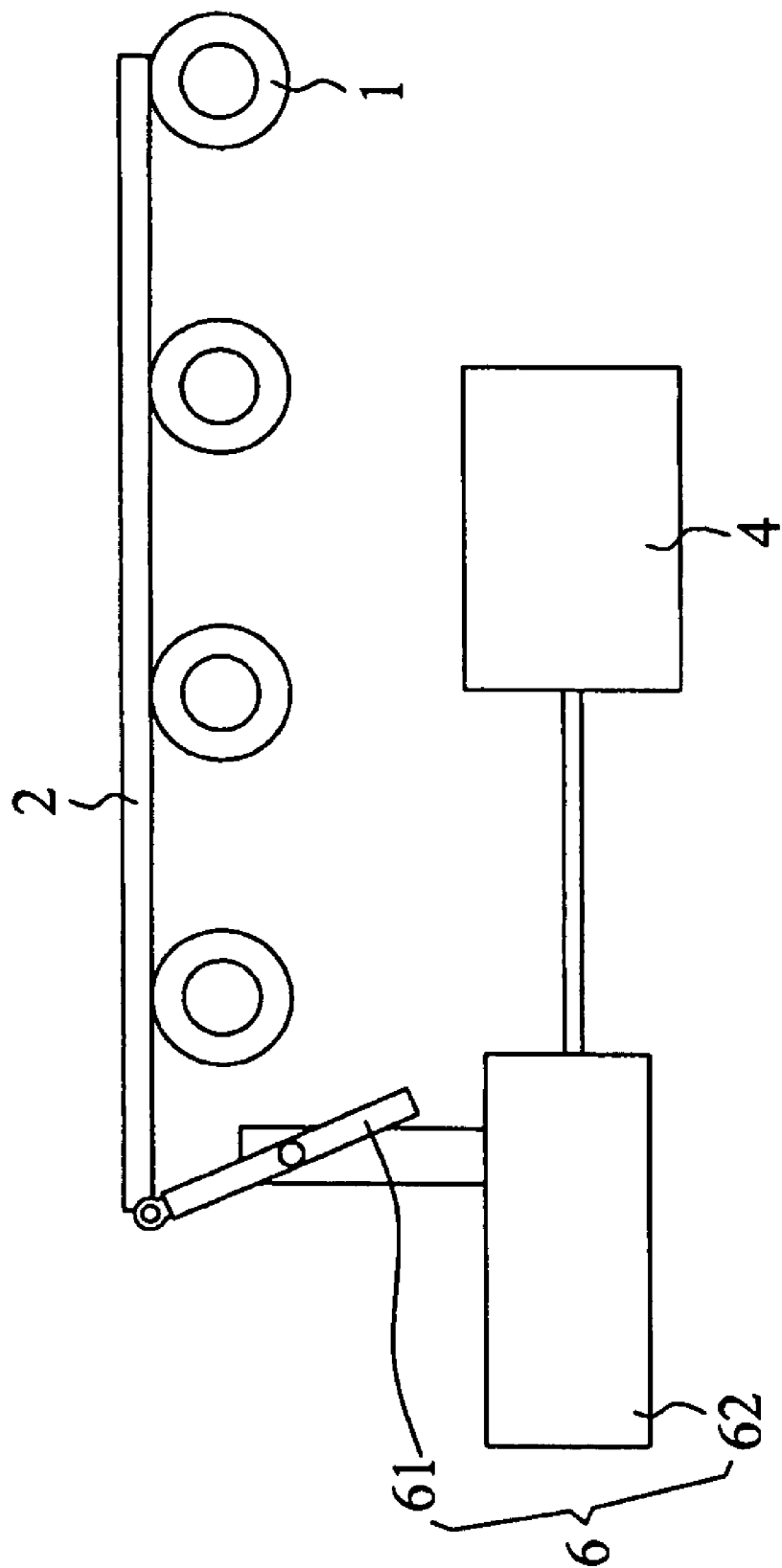
FIG. 3 is a schematic side plain view of a second embodiment of the present invention.

FIG. 3 shows an alternate form of the present invention. This embodiment is substantially similar to the aforesaid first embodiment of the present invention with exception that this second embodiment uses an inductive sensor 6 to substitute for the aforesaid photoreflective sensor 3. This inductive sensor 6 is comprised of a rocker 61 and a magnet 62. When one substrate 2 is passing over the sensor 6, the rocker 61 is biased and moved away from the magnet 62. After the substrate 6 passed through the sensor 6, the magnet 62 attracts the rocker 61 again. The time in which the rocker 61 is separated from the magnet 62 is calculated, and this detection time value is used for comparison with a predetermined time value.

Although the present invention has been explained in relation to its preferred embodiments, it is to be understood that many other possible modifications and variations can be made without departing from the spirit and scope of the invention as hereinafter claimed.

What is claimed is:

1. A device for detecting a cracked substrate adapted to detect at least one substrate delivered on a delivery apparatus, wherein said substrate has a bottom surface and a length, said bottom surface is placed on said delivery apparatus, and said device for detecting a cracked substrate comprises:

a sensor set corresponding to the bottom surface and adapted to detect the length of said substrate during delivery by said delivery apparatus so as to obtain a detection length value and to output a signal containing said detection length value; and a processor coupled to said sensor and adapted to receive said signal and to compare the detection length value contained in said signal with a predetermined length value stored therein so as to stop said delivery apparatus when the detection length value contained in said signal is unequal to said predetermined length value.

2. The device for detecting a cracked substrate as claimed in claim 1, wherein said sensor is a photoreflective sensor.

3. The device for detecting a cracked substrate as claimed in claim 2, wherein said sensor comprises an emitting side and a receiving side; said processor is coupled to the receiving side of said sensor.

4. The device for detecting a cracked substrate as claimed in claim 1, wherein said device for detecting a cracked substrate further comprises a power amplifier coupled between said sensor and said processor.

5. The device for detecting a cracked substrate as claimed in claim 1, wherein said delivery apparatus is a roller delivery apparatus.

6. The device for detecting a cracked substrate as claimed in claim 1, wherein said sensor is an inductive sensor.

7. A device for detecting a cracked substrate adapted to detect at least one substrate delivered on a delivery apparatus, wherein said substrate has a bottom surface and a length, said bottom surface is placed on said delivery apparatus, and said device for detecting a cracked substrate comprises:

a sensor set corresponding to the bottom surface and adapted to detect the time in which said substrate passed over said sensor during delivery by said delivery apparatus so as to obtain a detection time value and to output a signal containing said detection time value; and a processor coupled to said sensor and adapted to receive said signal and to compare the detection time value contained in said signal with a predetermined time value stored therein so as to stop said delivery apparatus when the detection time value contained in said signal is unequal to said predetermined time value.

8. The device for detecting a cracked substrate as claimed in claim 7, wherein said sensor is a photoreflective sensor.

9. The device for detecting a cracked substrate as claimed in claim 8, wherein said sensor comprises an emitting side and a receiving side; said processor is coupled to the receiving side of said sensor.

10. The device for detecting a cracked substrate as claimed in claim 7, wherein said device for detecting a cracked substrate further comprises a power amplifier coupled between said sensor and said processor.

11. The device for detecting a cracked substrate as claimed in claim 7, wherein said delivery apparatus is a roller delivery apparatus.

12. The device for detecting a cracked substrate as claimed in claim 7, wherein said sensor is an inductive sensor.

* * * * *